Inventors
Hans Rosskopf and
Albert Stieglitz by Knight Bros
Attorneys

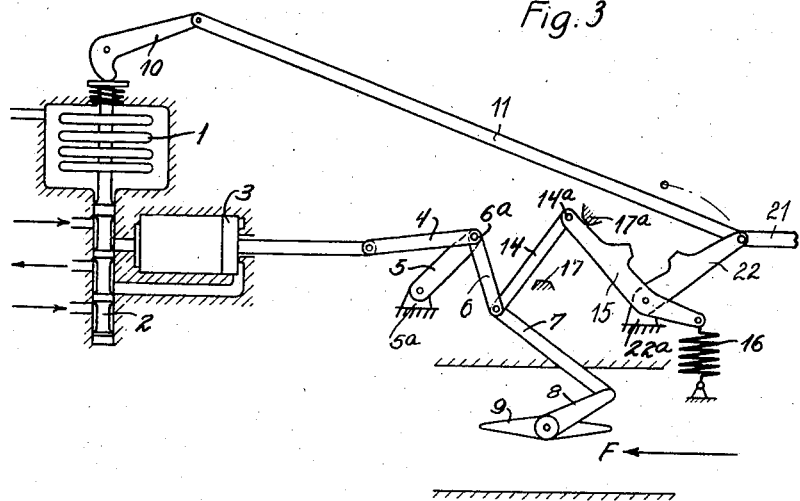
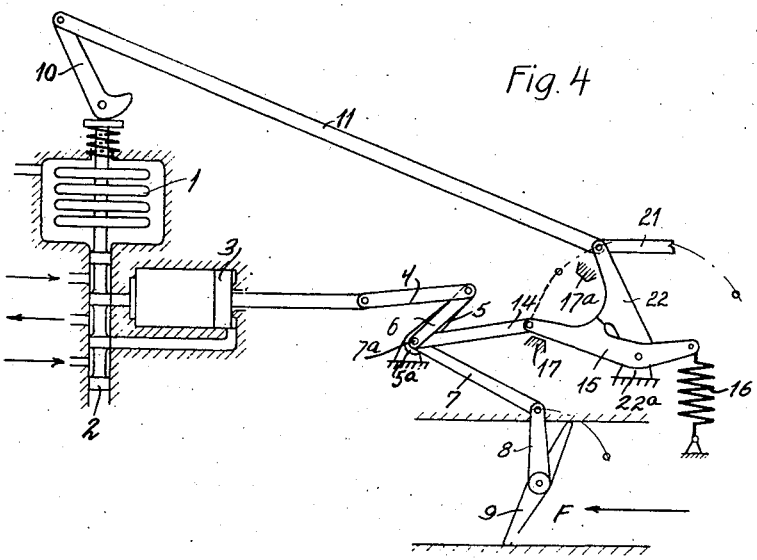

Patented Sept. 3, 1940

2,213,412

UNITED STATES PATENT OFFICE 2,213,412

POWER CONTROL GEAR FOR INTERNAL COMBUSTION ENGINES

Hans Rosskopf, Berlin - Charlottenburg, and Albert Stieglitz, Berlin-Spandau, Germany, assignors to Brandenburgische Motorenwerke Gesellschaft mit beschrankter Haftung, Berlin-Spandau, Germany, a corporation of Germany Application September 22, 1938, Serial No. 231,158
In Germany September 23, 1937

4 Claims. (Cl. 137—139)

This invention relates to an arrangement for controlling the power, i. e., the adjustment of the throttle in the intake pipe of supercharged or high-compression internal combustion engines particularly of high altitude engines, cooperating with a supercharger pressure governor. The known arrangements present the drawback that they are not completely reliable in operation, particularly in view of the fact that upon failure of the supercharger pressure governor (aneroid capsule fracture, failure of the governor gear or the like) the regulation is completely faulty and the pilot loses control over the engine. According to the invention the above drawbacks are removed and furthermore a regulating gear is provided which is of simple design and reliable in operation.

According to the invention two control rods operated by means of a hand lever and actuated one after the other are provided for adjusting the throttle, the latter being directly adjusted by one of said control rods in the lower range of power, whereas in the adjacent upper range of power it is adjusted by the other control rod with the aid of the supercharger pressure governor. The advantage of the invention consists not only in the elimination, by the direct control of the throttle, of the detrimental effect on the supercharger pressure governor or the servo motor controlled by it within the lower range of power, due to small power and low speed of the engine, but it is also possible upon failure of the supercharger pressure governor, owing to an aneroid capsule fracture or failure of the governor gear, to control the engine throughout the entire range of power by means of the hand-controlled rod acting directly on the throttle. By connecting the actuating rods for the throttle with each other so that one rod forms the pivotal support for the movement of the other rod and in such a manner that in a certain position of the hand-operated lever within its range a movement of the control rod presents a backlash with respect to the actuation of the throttle, the supercharger pressure governor is prevented within the directly effective range of the hand-operated lever from exerting any influence. In this case the positions of the hand-operated lever and those of the throttle always correspond regardless of whether the supercharger governor is intentionally out of operation or only fails to operate. It is then preferable to choose the closed position of the throttle so that the pilot may stop the engine at any time with certainty.

In the accompanying drawings an embodiment of the invention is shown in diagrammatic form, in which Fig. 1 shows one form of control gear in which the supercharger governor is positively controlled by the hand throttle only for a limited range of throttle positions.

Fig. 3 shows the modification, Fig. 2, in a position in which the throttle is in a completely open position, and Fig. 4 indicates the position of the control gear of Fig. 2 in a position of the supercharger pressure governor in case a fracture of the aneroid capsule has occurred at wide open throttle and where the throttle has been closed by hand.

Figure 1:
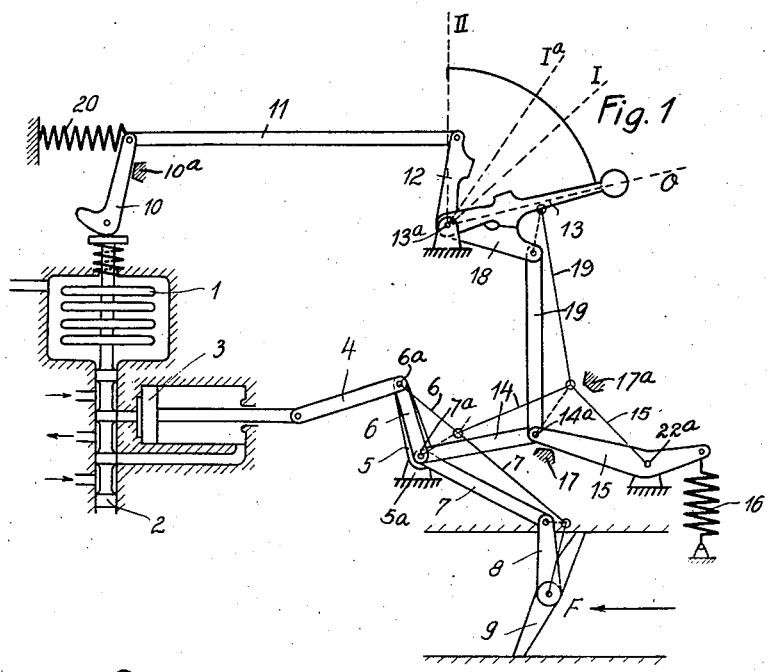

Referring to Fig. 1, the governor for automatically controlling the position of supercharger throttle 9 is composed of an aneroid capsule 1 of conventional design, which by its expansion and contraction (following varying charging pressures) moves slide valve 2 of a servo-motor to control the admission or the exhaust of operating medium for actuating motor piston 3 in conventional manner. The normal operating range of valve 2, and thus the operating range of this governor, can be varied by cam lever 10 normally held by compression spring 20 against stop 10ª. By swinging lever 10 to the left in Fig. 1, the motor control system 1, 2 is shifted and thus its operating range varied. Cam lever 10 is pivotally attached at its upper end to a push rod 11, the other end of the latter being attached to an arm 12 pivoted at 13ª at which also the hand control lever 13 is freely pivoted. It will be seen that if lever 13 is moved counter-clockwise until it abuts against arm 12, the latter can be taken along on further travel of lever 13 and thereby the entire range of operation of the system 1, 2, 3 be controlled by hand if desired. Piston 3 is connected by connecting rod 4 at crank pin 6ª to a crank arm 5 journalled at 5ª. To the crank pin 6ª is also pivoted one end of a link system 6, 7, jointed at 7ª and connected at the other end to arm 8 of throttle 9. The position of joint 7ª is adjustable by control link 14 pivotally attached to it at one end, and pivotally attached at its other end to a bell crank 15 pivoted at 22ª and controlled by a tension spring 16, tending to pull bell crank 15 against stop 17ª, in which the link system 6, 7, shown broken in full lines in Fig 1, is straightened out as shown in single lines. In the full-line position, joint 7ª coincides with the journal center 5ª of crank 5, so that when the latter is turned clockwise no effect can be produced upon the position of throttle 9 which is then closed or substantially closed, representing the lowest supercharger pressure which can be adjusted, while if links 6, 7 are straightened out by the aforementioned means, throttle 9 is opened further by hand and then these links act together as a stiff push rod and permit crank 5, when actuated clockwise by the governor 1, 2, 3, to further open throttle 9 or to again move it toward closing when crank 5 is moved counterclockwise. For the purpose of rendering the governor inoperative, no matter where its crank 5 happens to stand, pivot point 14ª between control link 14 and bell crank 15 is pivotally connected by push rod 19 to an arm 18 pivoted itself at the hand lever pivot 13ª. Thus if hand lever 13 is moved clockwise, against arm 18, it will push bell crank 15 from stop 17ª where it is normally held by spring 16 toward stop 17, thereby gradually lessening the extent of the control effect of crank 5 on throttle 9 for the reasons aforedescribed until, with the arrival of joint 7ª in the position shown in full lines in Fig. 1, the control effect of crank 5 and the governor is completely eliminated. Thus for low power output of the engine, when hand lever 13 is moved clockwise against arm 18, the extent of the governor control effect on throttle 9 is gradually lessened to zero value shown in Fig. 1, while when the throttle is opened beyond a given point I, at which bell crank 15 is allowed to abut against stop 17ª, complete automatic control is given to the governor because there links 6, 7 are stretched and movements of crank 5 become effective, and upon further counterclockwise motion of lever 13 beyond point Iª where arm 12 is taken along, the operating range of the governor can be adjusted for higher and higher engine power up to the maximum range at point II within which throttle 9 is wide open.

Figure 2:
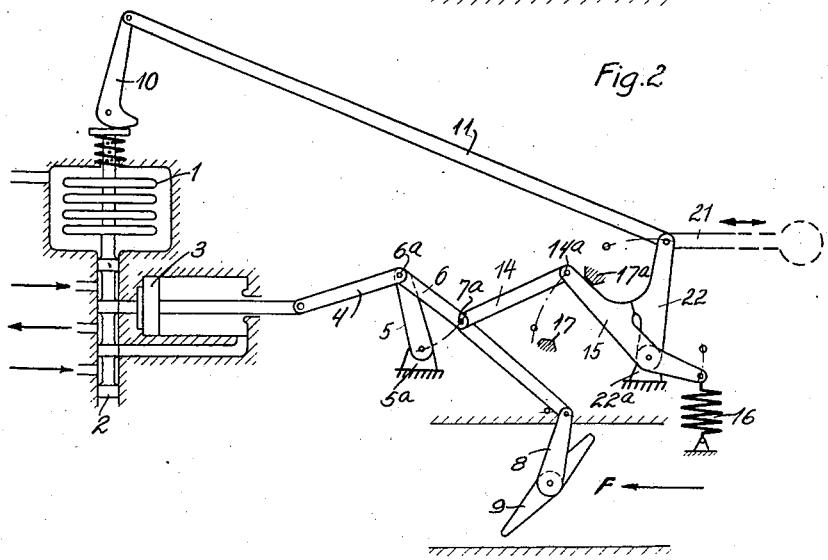
Fig. 2 shows a modification of Fig. 1 in which the supercharger pressure governor is positively controlled with regard to its ranges at all times by the hand throttle.

In Fig. 2 an arrangement is shown which in most of its essential elements is similar to that of Fig. 1, except that in Fig. 2 the governor range setting cam lever 10 is at all times directly and positively controlled by the hand throttle lever during all of the latter's operating positions. In this figure the elements 1—9 and 14—17 are disposed and function in the same manner as described with reference to Fig. 1. Cam lever 10 swings in this case clockwise instead of counterclockwise as shown in Fig. 1 in order to vary the power control range of the governor 1, 2, 3 from its lowest value upwardly. Further in this case operating rod 11 for lever 10 is connected at its other end to an arm 22 pivoted at the pivot point 22ª of bell crank 15 so that it can engage the latter when operated counterclockwise by throttle rod 21 also connected to arm 22. The elements are shown in Fig. 2 in a position in which the link system 6, 7 is stretched so that governor crank 5 can automatically actuate throttle 9 as directed by the governor action; in other words, the throttle is within full control of the governor at the minimum engine power range within which the governor can exercise control. If throttle rod 21 is shifted to the right, the governor elements 1, 2 are set for a higher power range during which throttle 9 is opened wider, and its position is automatically controlled by the governor within that range so long as throttle rod 21 is held in this shifted position. The widest open position is shown in Fig. 3. If, on the other hand, throttle rod 21 is shifted to the left from the position shown in Fig. 2, arm 22 rocks counterclockwise and first decreases the control range of the governor within which the throttle is controlled nearer closing positions. Secondly, rocking arm 22 rocks bell crank 15 counterclockwise and thereby actuates link gear 14, 6, 7 to gradually lessen the extent of the governor control effect upon throttle 9 in the manner aforedescribed until pivot points 7ª and 5ª register as shown in Fig. 4, when throttle 9 is closed or substantially closed as may be selected by the design of the gear, and solely by hand control without the action of the governor, which by that time through throwing of its cam lever 10 also counterclockwise has been set for its lowest range which is, however, ineffective on account of the aforementioned ineffectiveness of the crank 5 upon throttle 9. Thus, even if it may be assumed in Fig. 4 that just previously the governor had been set to the highest wide open automatically-controlled throttle range (which may be assumed from the right-hand position of piston 3 and the incident position of crank 5), the pilot, in case of a break of capsule 1 with its incident disorder in the automatic control, by quickly pushing the hand-controlled gear 21, 22, 15, 14, 6, 7 into the position shown in Fig. 4, can immediately assume complete hand control over the engine and set the throttle to any position desired. Consequently, according to the present arrangements, the pilot always maintains control over the engine speed in case of emergency, whether the latter should call for a decrease or an increase in speed.

What is claimed is:

1. In an arrangement for regulating the power of supercharged internal combustion engines and including a supercharger throttle, a supercharger governor and a hand control element, both for controlling said throttle, a throttle control gear interposed between said throttle and said hand control element to operate the throttle directly by hand within a given range from minimum power upward, and a throttle control gear between said governor and said first-named control gear and arranged to operate said throttle by the governor action exclusively when the first-named control gear has reached the extreme power end of its range, and means operable by said hand control element for varying the throttle control range of said governor after the latter has taken over the exclusive throttle control.

2. In an arrangement for regulating the power of supercharged internal combustion engines and including a supercharger throttle, a supercharger governor and a hand control element, both for controlling said throttle, a spring-actuated control gear interposed between said throttle and said hand control element tending to open the throttle directly within a given range from minimum power upward and controllable by said hand control element within said range, a throttle control gear between said governor and said first-named control gear and arranged to operate said throttle by the governor action exclusively when the first-named control gear has reached the extreme power end of its range, and means operable by said hand control element for varying the throttle control range of said governor after the latter has taken over the exclusive throttle control.

3. In an arrangement for regulating the power of supercharged internal combustion engines and including a supercharger throttle, a supercharger governor and a hand control element, both for controlling said throttle, a throttle control gear interposed between said throttle and said hand control element to operate the throttle directly by hand within a given range from minimum power upward, a throttle control gear between said governor and said first-named control gear and arranged to operate said throttle by the governor action exclusively when the first-named control gear has reached the extreme power end of its range, and means positively operated by said hand control element for varying the throttle control range of said governor after the latter has taken over the exclusive throttle control.

4. In an arrangement for regulating the poweer of supercharged internal combustion engines and including a supercharger throttle, and a supercharger governor and a hand control element, both for controlling said throttle, a journalled crank arm connected with said governor to be operated by the latter, a double link connected between said crank arm and said throttle for operating the latter, the first link element adjacent to said arm being of the same length as said arm, a spring-actuated follow-up connection between the joint of said link elements and said hand control element forming a floating pivot support for said joint and tending to straighten out said link elements, so that when said joint registers with the journal axis of said crank arm, due to a low power hand control position, the governor operation of said arm is ineffective upon said throttle, and the latter is controllable directly by said hand control element by way of the floating pivot support and the second link element within a given minimum engine power range, and when said link elements are held straightened out by said pivot support, the throttle is exclusively controlled by the action of said governor beyond said minimum power range, and means operable by said hand control element for varying the throttle control range of said governor after the latter has taken over the exclusive throttle control.

HANS ROSSKOPF.
ALBERT STIEGLITZ.